US009177142B2

(12) United States Patent
Montoro

(10) Patent No.: US 9,177,142 B2
(45) Date of Patent: Nov. 3, 2015

(54) IDENTIFICATION OF ELECTRONIC DOCUMENTS THAT ARE LIKELY TO CONTAIN EMBEDDED MALWARE

(75) Inventor: Rodrigo Ribeiro Montoro, Mirandópolis (BR)

(73) Assignee: TRUSTWAVE HOLDINGS, INC., Chicago, IL (US)

( * ) Notice: Subject to any disclaimer, the term of this patent is extended or adjusted under 35 U.S.C. 154(b) by 0 days.

(21) Appl. No.: 13/274,077

(22) Filed: Oct. 14, 2011

(65) Prior Publication Data

US 2013/0097705 A1 Apr. 18, 2013

(51) Int. Cl.
*G06F 21/56* (2013.01)
(52) U.S. Cl.
CPC ................... *G06F 21/562* (2013.01)
(58) Field of Classification Search
CPC ....... G06F 21/00; G06F 21/56; G06F 21/562; G06F 21/565
USPC ........ 726/24, 22; 715/200, 201; 713/188, 189
See application file for complete search history.

(56) References Cited

U.S. PATENT DOCUMENTS

| | | | | |
|---|---|---|---|---|
| 2011/0083180 A1* | 4/2011 | Mashevsky et al. | ............ | 726/23 |
| 2011/0289582 A1* | 11/2011 | Kejriwal et al. | ................ | 726/22 |
| 2013/0081142 A1* | 3/2013 | McDougal et al. | ............ | 726/24 |

OTHER PUBLICATIONS

Kittilsen, Jarle. "Detecting malicious PDF documents." In: [online]. Dated Jan. 12, 2011. Retrieved from the Internet at URL: <http://brage.bibsys.no/hig/retrieve/2128/Jarle%20Kittilsen.pdf>.*
Baccas, P. "Finding rules for heuristic detection of malicious pdfs: With analysis of embedded exploit code." In Virus Bulletin Conference. (2010).*
Golub, T., Slonim, D., Tamayo, P., Huard, C., Gaasenbeek, M., Mesirov, J., Coller, H., Loh, M., Downing, J., Caligiuri, M., Bloomfield, C. and Lander, E. (1999) Molecular classification of cancer: class discovery and class prediction by gene expression monitoring. Science, 286, 531-537.*
Montoro, Rodrigo, "SET (Social Engineer Toolkit) PDF's × AntiVirus & Scoring System," posted on Aug. 16, 2010, Sp0oKeR Labs, [retrieved from the internet on Jul. 14, 2014 at http://spookerlabs.blogspot.com/2010/08/set-social-engineer-toolkit-pdfs-x.html], 5 pages.
Trustwave Spiderlabs, "Advanced Topic of the Week: Preventing Malicious PDF File Uploads," Oct. 5, 2010, SpiderLabs Anterior, [retrieved from the internet on Jul. 14, 2014 at http://blog.spiderlabs.com/2010/10/advanced-topic-of-the-week-preventing-malicious-pdf-file-uploads.html], 3 pages.

(Continued)

*Primary Examiner* — Andrew W Johns
(74) *Attorney, Agent, or Firm* — Hanley, Flight & Zimmerman, LLC

(57) ABSTRACT

The present invention provides a method for determining the likelihood that an electronic document contains embedded malware. After parsing or sequencing an electronic document, the metadata structures that make up the document are analyzed. A number of pre-established rules are then applied with respect to certain metadata structures that are indicative of embedded malware. The application of these rules results in the generation of a score for the electronic document being tested for embedded malware. The score is then compared to a threshold value, where the threshold value was previously generated based on a statistical model relating to electronic documents having the same format as the document being tested. The result of the comparison can then be used to determine whether the document being tested is or is not likely to contain embedded malware.

23 Claims, 6 Drawing Sheets

(56) References Cited

OTHER PUBLICATIONS

Admin, "Scoring PDFs Based on Malicious Filter," Dec. 8, 2010, 9b+ Security Research and Development, [retrieved from the internet on Jul. 14, 2014 at http://blog.9bplus.com/scoring-pdfs-based-on-malicious-filter/], 2 pages.

Admin, "PDF X-Ray," Dec. 1, 2010, 9b+ Security Research and Development, [retrieved from the internet on Jul. 14, 2014 at http://blog.9bplus.com/pdf-x-ray/], 2 pages.

Stevens, Didier, "PDF Tools," Didier Stevens Labs, [retrieved from the internet on Jul. 14, 2014 at http://blog.didierstevens.com/programs/pdf-tools/], 26 pages.

* cited by examiner

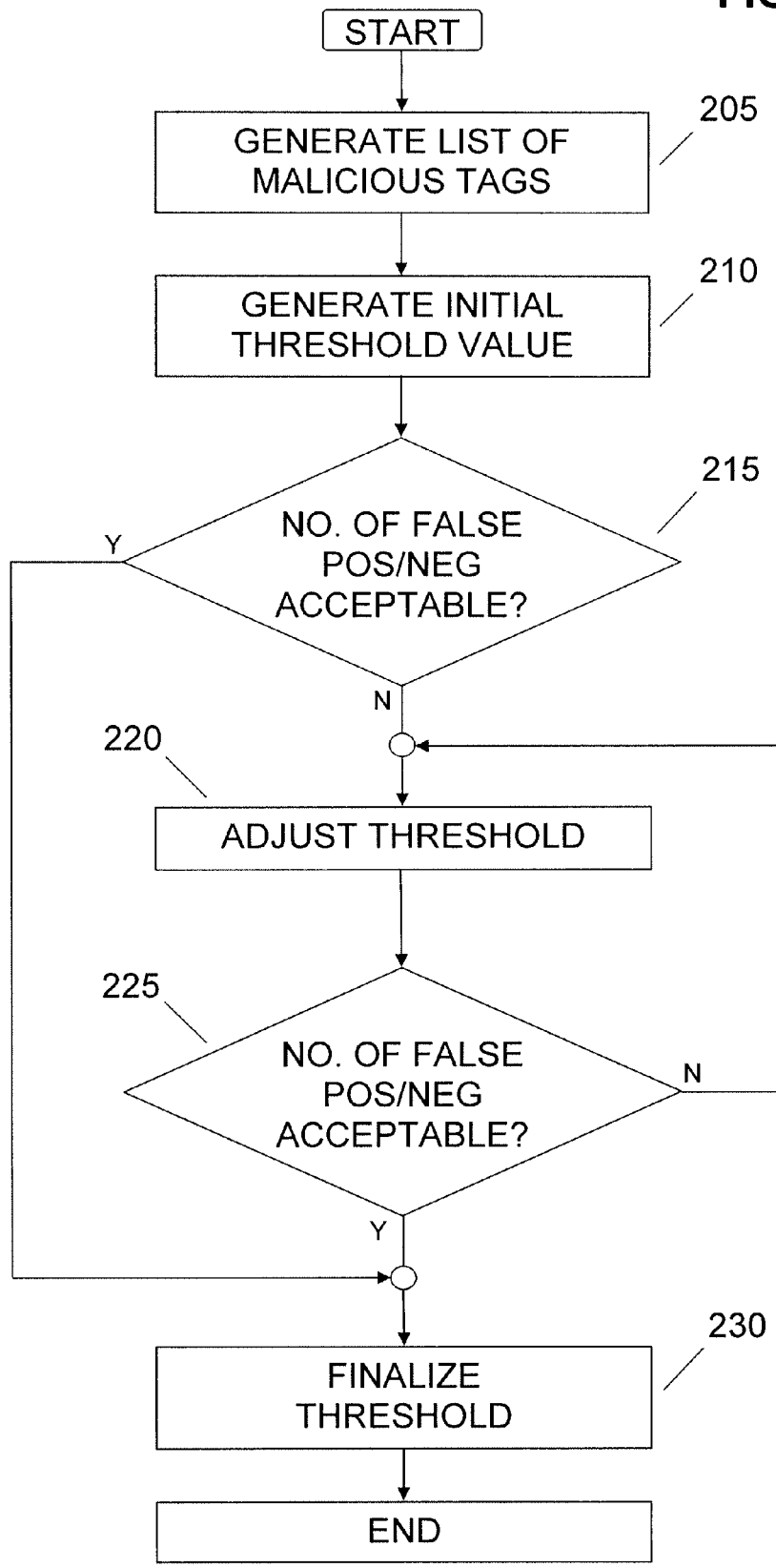

Header

File Body

Objects
Boolean values
Integer and real numbers
Strings
Names
Arrays
Dictionaries
Streams
The null object

Cross Reference Table

Trailer

FIG. 5

IDENTIFICATION OF ELECTRONIC DOCUMENTS THAT ARE LIKELY TO CONTAIN EMBEDDED MALWARE

FIELD OF THE INVENTION

The present invention relates to malware identification. More particularly, the present invention relates to the analysis of electronic documents and the determination as to whether an electronic document is likely to contain embedded malware.

BACKGROUND OF THE INVENTION

Malware is a general term for malicious software. Underlying all such software is some malicious intent or purpose. For example, some malware is designed to vandalize by causing data loss or damage to equipment. Other malware is designed to steal data. Still other malware is designed to subject users to forced advertising.

Malware is often categorized by the way it carries out the underlying malicious intent or purpose. Infectious malware, for example, is so named because of the way in which it spreads from one system to another system, much like a virus. In fact, certain infectious malware programs are referred to as viruses. Concealed malware is often disguised as something that is not harmful or malicious.

The two most common vehicles that attackers have used to deliver malware have been emails and programs intentionally or unintentionally downloaded from the Internet. Notably, attackers often use electronic documents to deliver malware. Such documents may include Portable Document Format (PDF) documents, Microsoft® Word formatted documents, Hypertext Markup Language (HTML) documents and others. The more sophisticated and complex the format, the better the document format is for delivering malware.

In a broad sense, electronic documents are composed of data and metadata. The data is essentially that part of the document that is perceived by the party viewing the document. It is the intended content—the text, the images, the graphics. In contrast, the metadata provides information about the data (e.g., the purpose of the data, when the data was created, the format of the data, the source of the data). If, for example, the data is a digital image embedded in the document, the metadata associated with the digital image may convey the size of the image, the color of the image and/or the resolution of the image. While the metadata is processed in order to render the data, it is generally invisible to the user.

Prior methods and systems for identifying malware associated with or embedded in electronic documents have focused on pattern matching. Typically, these prior methods and systems search the data for certain predefined byte sequences. The byte sequences may, for example, represent certain predefined words that are indicative of malicious intent, for example, sexually explicit words. When these prior methods or systems identify one or more predefined byte sequences in a given document, the document may be discarded before the malicious intent can be realized or carried out. This process of searching the data for predefined byte sequences is sometimes referred to as pattern matching.

There are two significant deficiencies with pattern matching. First, the predefined byte sequences may not be malicious. In this instance, the pattern matching process may identify a document as containing malicious intent when, in fact, it contains no malicious intent. We may refer to this result as a false positive result. This is not a good situation because it may lead to the discarding of perfectly safe, malware free electronic documents. Second, the associated electronic document may not contain any byte sequences indicative of malicious intent. Nevertheless, the electronic document may still contain malware embedded in the metadata. In this case, the aforementioned pattern matching process would completely miss the malware because the process only looks at the data. This, in turn, may lead to a false negative result, where the malware embedded in the metadata of the electronic document goes undetected and the malicious intent is fulfilled.

This issue is exacerbated by the proliferation of malware creation programs, which allows attackers to augment certain file types with malicious payloads. Pattern matching efforts are largely baffled by this approach due to the wide number of malicious files that result from these programs.

What is needed is a method and/or a system that identifies malware embedded in electronic documents using a balanced approach, such that the discarding of otherwise malware-free documents is minimized and the discarding of documents containing malware is maximized.

SUMMARY OF THE INVENTION

The present invention obviates the aforementioned and other deficiencies associated with the prior methods and systems. In general, the present invention accomplishes this by focusing on the metadata, which may be more indicative of the presence of embedded malware. In doing so, the present invention employs a statistical approach that involves the generation of a statistical model based on an analysis of many known documents having the same format, and the subsequent comparison of a given electronic document, having the same format, to said model, such that discarding otherwise malware-free documents is minimized and discarding electronic documents that contain embedded malware is maximized.

Thus, in accordance with one aspect of the present invention, the above identified and other objectives are achieved by a method of determining the likelihood that an electronic document contains embedded malware. The method comprises, among other things, processing one or more signals that represent the contents of the electronic document, in order to identify one or more pre-defined metadata structures that, at least in part, make up the electronic document. The method also involves applying a set of pre-established rules to the one or more pre-defined metadata structures such that a numerical score is automatically attributed to the electronic document. Then a first signal representing the numerical score attributed to the electronic document is compared to a second signal representing a pre-established model threshold value. A determination can then be made as to whether the electronic document is likely to contain embedded malware based on a result of the comparison.

In accordance with another aspect of the present invention, the above identified and other objectives are achieved by a method of determining the likelihood that an electronic document contains embedded malware, where this method comprises among other things, processing one or more signals that represent the contents of the electronic document in order to identify one or more pre-defined metadata structures that, at least in part, make up the electronic document, and attributing a weighting value to each of the identified, one or more pre-defined metadata structures. The weighting value attributed to each identified, pre-defined metadata structure reflects the degree to which the corresponding, pre-defined metadata structure relates to the likelihood the document contains embedded malware. The method further involves automatically generating a numerical score for the electronic document by compiling the weighting values that were attributed to each of the identified, one or more pre-defined metadata structures; comparing a first signal representing the numerical score attributed to the electronic document to a second signal representing a pre-established model threshold value; and determining whether the electronic document is likely to contain embedded malware based on a result of said comparison.

BRIEF DESCRIPTION OF THE DRAWINGS

Several figures are provided herein to further the explanation of the present invention. More specifically:

FIG. 2 is a flowchart illustrating a method for establishing a model threshold value, in accordance with exemplary embodiments of the present invention;

FIG. 5 is a diagram illustrating the general structure of a PDF document.

DETAILED DESCRIPTION

It is to be understood that both the foregoing general description and the following detailed description are exemplary. As such, the exemplary methods and other embodiments described herein below are not intended to limit the scope of the present invention. Instead, the scope of the present invention is governed by the scope of the appended claims.

There is more to an electronic document than what the user sees when the document is printed or rendered on a display screen. If one were to look at the complete physical makeup of an electronic document, regardless of the electronic document format, one would see a collection of data structures. Each of these data structures describes or defines some aspect of the corresponding electronic document. For example, a given data structure may identify an interactive element, such as a hyperlink, embedded in the electronic document. Other data structures may define a specific physical characteristic of the electronic document, such as the format of the document, the number of pages that make up the document, a paragraph of text, a graphic, or a digital image. Still other data structures may relate to an action that will take place in response to an event, such as an action when the document is opened.

If one were to inspect a particular one of these data structures, they would see that, in general, the data structure comprises metadata and, in some instances, actual data (i.e., data that is printed or otherwise available for the user to readily see). As stated above, prior technology has focused on the actual data to determine whether an electronic document contains malware. However, in accordance with exemplary embodiments of the present invention, the focus is on the metadata, and more specifically, the presence of certain metadata structures and, the presence of certain combinations of metadata structures.

In general, the present invention makes a determination as to the likelihood that malware is present in an electronic document by parsing the electronic document, identifying the metadata structures, and applying a number of pre-established rules with respect to the identified metadata structures. The application of each pre-established rule yields a numerical result. The numerical results are then combined to produce an overall score. In some situations, the rules may result in an adjustment of the overall score. The overall score is then compared to a threshold value that relates to the aforementioned model that represents all such electronic documents having the same format. The result of the comparison is then used to determine whether the electronic document is more or less likely to contain embedded malware.

Figure 1:
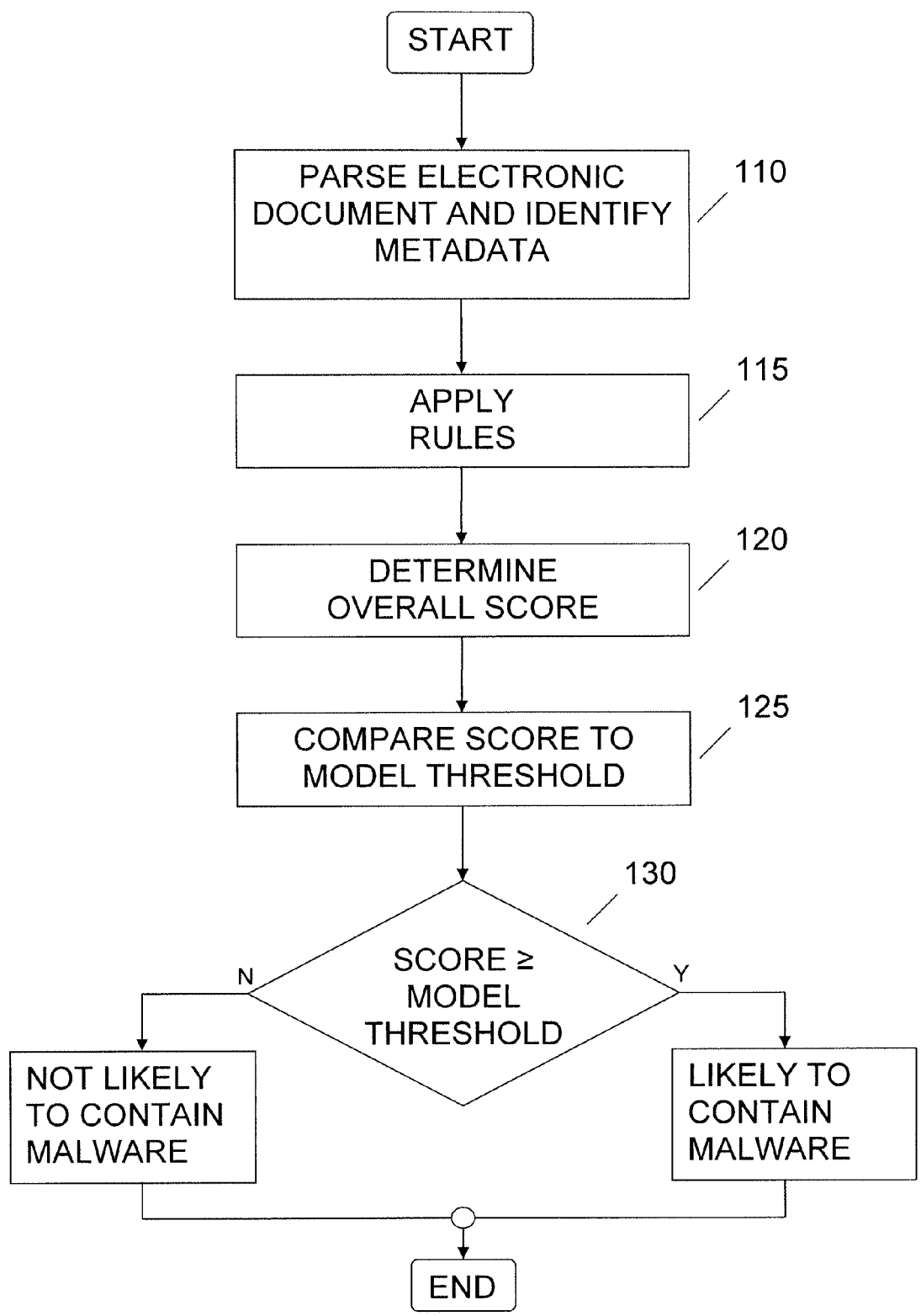
FIG. 1 is a flowchart illustrating a general method for determining whether an electronic document is likely to contain embedded malware, in accordance with exemplary embodiments of the present invention.

FIG. 1 is a flowchart illustrating a general method for determining whether an electronic document is likely to contain embedded malware, in accordance with exemplary embodiments of the present invention. It is important to first note that step 125 requires a comparison with a model threshold value as briefly explained above. Thus, in accordance with a preferred embodiment of the present invention, determining the model threshold value involves a process that would occur prior to utilizing the general method of FIG. 1.

FIG. 2 then is a flowchart illustrating a method for establishing the aforementioned model threshold value. After the model threshold value has been established, it can be used in the general method for determining whether an electronic document is likely to contain embedded malware, that is, it can be used in the method of FIG. 1. It will be understood that the method for establishing a model threshold value illustrated in FIG. 2 is exemplary, and that other methods may be employed to achieve the same or similar purpose.

In general terms, the model threshold value is generated by analyzing a plurality of pre-existing electronic documents that have the same format, such as Microsoft Word® formatted documents, PDF formatted documents, HTML, or other known formats. It will be known in advance whether or not each of the pre-existing documents contain embedded malware. The actual number of pre-existing documents that must be analyzed in order to generate the threshold may vary. However, from a statistical perspective, the greater the number of pre-existing electronic documents analyzed, the more accurate the model threshold value is likely to be. It is possible several thousand pre-existing documents will be analyzed to generate the model threshold value.

Further, each of the pre-existing electronic documents will be parsed or sequenced. To accomplish this, known software tools may be employed. It is necessary to parse or sequence the documents so that the metadata structures that make up each document can be analyzed. It will be understood that electronic documents that contain embedded malware tend to contain different metadata or a different arrangement of metadata compared to electronic documents that contain no embedded malware. With this understanding, it will be appreciated that upon analyzing many pre-existing electronic documents known to contain malware and many pre-existing electronic documents known to be free of any malware, a statistical model can be generated that accurately reflects all documents having that same format. As explained below, the statistical model will be based, in part, on a list of at least the most common metadata structures and combinations thereof that are found to exist in electronic documents, having that same format, that are known to contain embedded malware.

The illustrative method of FIG. 2 for establishing a model threshold value begins with generating a list of metadata structures that are most common among electronic documents, having the same format, known to contain embedded malware. As such, these metadata structures may, at least statistically, indicate the presence of embedded malware. For ease of discussion, these particular metadata structures are, on occasion, referred to herein below as malicious tags. For example, in the context of PDF documents, one such metadata structure is called PAGE, and it indicates the number of pages that make up the PDF document. If the value associated with PAGE is zero (0), it is a good indication of malware.

The list of malicious tags may be generated as the result of parsing and subsequently analyzing the many electronic documents, having the same format, which are known to contain embedded malware. Subsequently, it is possible to identify these tags in electronic documents being tested. It will be understood that the list of malicious tags may also be generated, in whole or in part, by researching the work of others. Still further, it will be understood, that the list may be updated through further analysis, research and even some trail and error.

Once the list of malicious tags has been established, an initial threshold value is generated, as shown by step 210. This is likely to involve parsing or otherwise analyzing many pre-existing documents, of the same type, as explained above, including electronic documents that are known to contain embedded malware and electronic documents that are known to be free of malware. The terms parsing and otherwise analyzing generally refer to the process of exposing the underlying structure of each document, thereby identifying all of the metadata structures that make up the electronic document. As one skilled in the art will readily appreciate, there are known software tools that can perform this process.

By identifying all of the metadata structures that make up each document, it is then possible to determine whether the metadata structures include any of the malicious tags from the list of malicious tags generated as a result of step 205. Then, if each identified malicious tag is assigned, at least initially, a weighting value of "1", it is possible to generate a score for each parsed and analyzed document. For example, if it is determined after parsing or otherwise analyzing a given electronic document that the document contains six malicious tags, the document would receive a score of six. After parsing, analyzing and scoring many such documents, possibly thousands of documents, all having the same type, where each of which is known in advance whether it does or does not contain embedded malware, a statistical model can be constructed for those documents known to be free of embedded malware and for documents known to contain embedded malware.

Figure 3A:
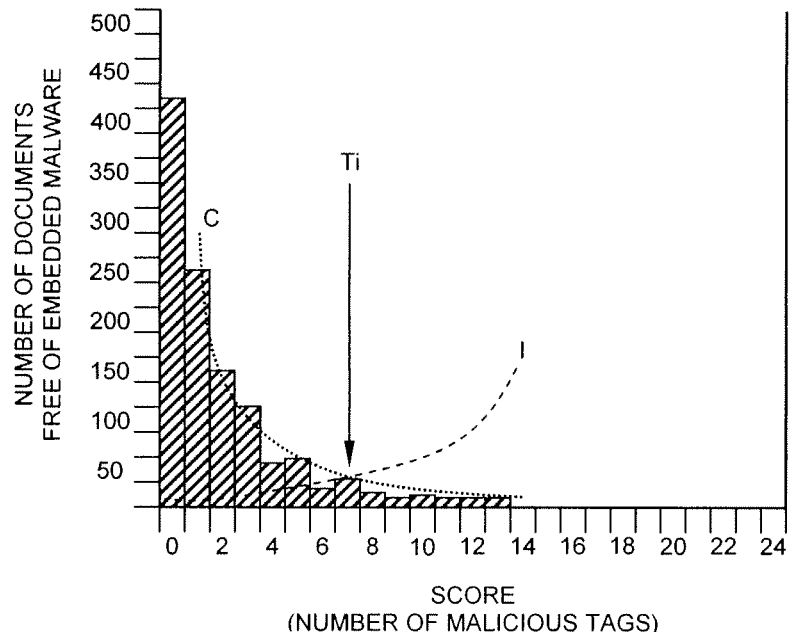
FIGS. 3A and 3B are graphs illustrating exemplary results from scoring documents known in advance to be free of embedded malware and scoring documents known in advance to contain embedded malware, respectively, accordance with exemplary embodiments of the present invention.
Figure 3B:
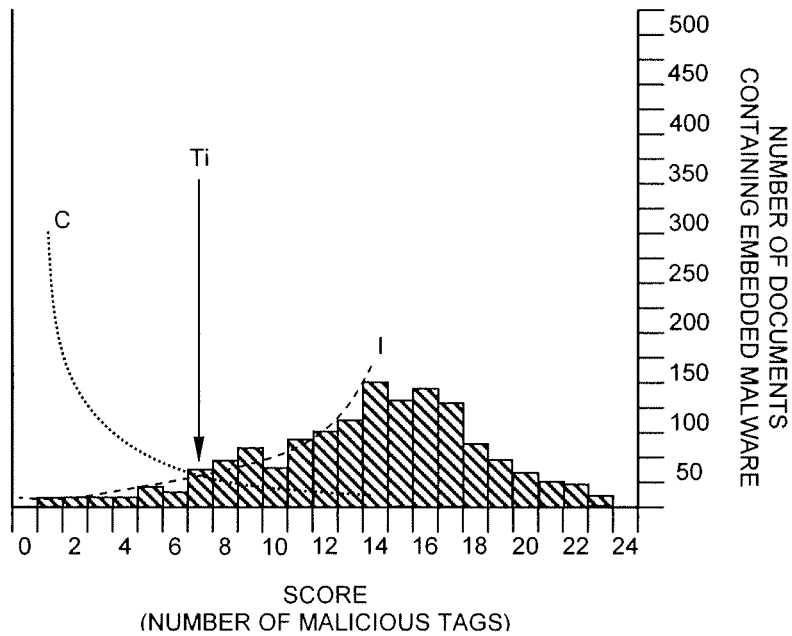

FIGS. 3A and 3B are two graphs illustrating exemplary results after scoring approximately 1000 documents which were known in advance to be free of any embedded malware and scoring approximately 1000 documents which were known in advance to contain embedded malware, respectively. Again, based on a desired accuracy of the resulting model and threshold value, it may be necessary to analyze far more pre-existing documents than in this example. First, with respect to the graph in FIG. 3A, the number of documents decreases as the score (i.e., the number of malicious tags) increases. This is expected because the documents upon which the graph of FIG. 3A is based were all free of embedded malware. Second, with respect to the graph in FIG. 3B, the number of documents increases, up to a point, as the score increases. This too is expected because the documents upon which the graph of FIG. 3B is based all contained embedded malware. Further, with respect to the graph of FIG. 3B, the number of documents decreases as the score increases beyond approximately 14, because in this example, it was not common for documents to contain that many malicious tags even though the documents contained some embedded malware.

With further reference to FIGS. 3A and 3B, curves C and I represent a curve fit solution for the number of documents free of embedded malware as a function of score and for the number of documents containing embedded malware as a function of score, respectively. For ease of illustration, curve C and curve I are reproduced on the graphs in FIGS. 3A and 3B.

Point Ti on the graphs of FIGS. 3A and 3B is the point at which curves C and I intersect. The intersection of curves C and I represents the point where, at least initially, the number of documents and the score (i.e., the number of malicious tags) are the same for both documents that are free of embedded malware and documents that contain embedded malware. In this example, the score associated with Ti, which is approximately 7, can be set as the initial threshold value, in accordance with step 210. Thus, if an electronic document is subsequently tested using this model, it may be determined that the document is likely to contain embedded malware if the score is greater than or equal to the initial threshold value of 7. On the other hand, it may be determined that the document is likely to be free of embedded malware if the score is less than the initial threshold value of 7.

Figure 4A:
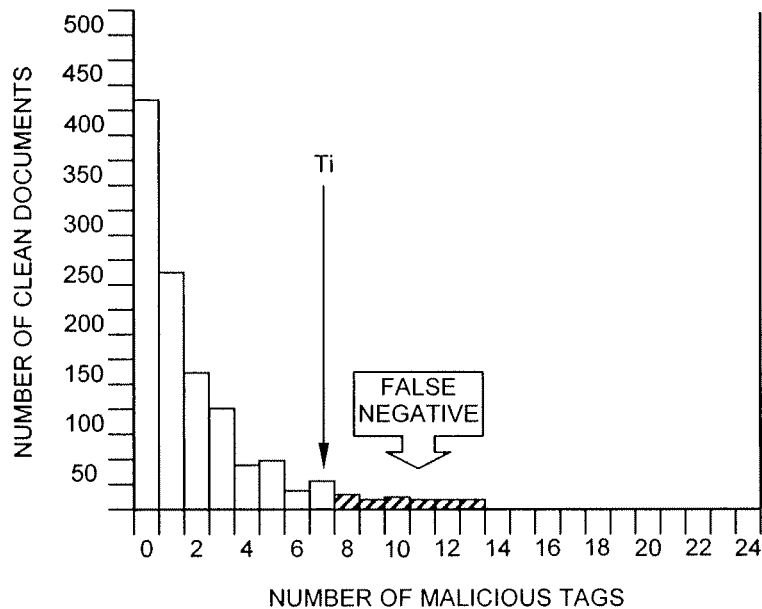
FIGS. 4A and 4B illustrate the context of false positive and false negative determinations, in the context of the present invention.
Figure 4B:
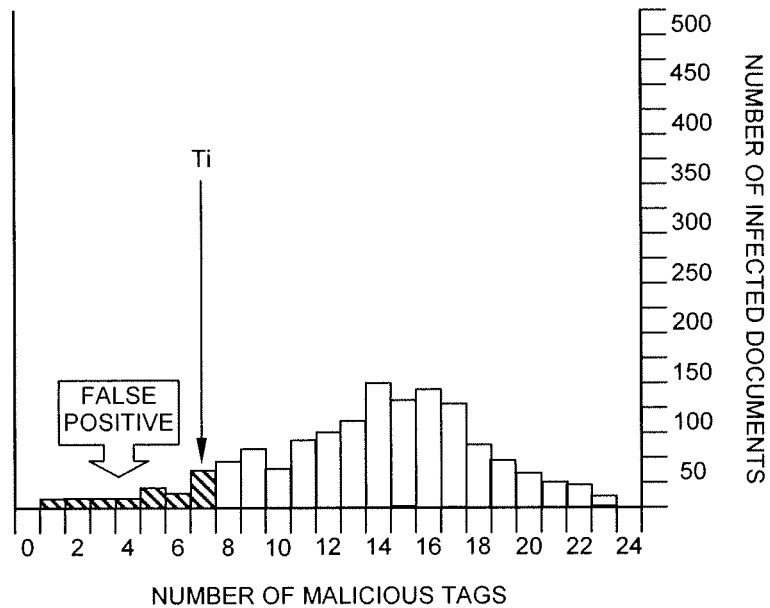

FIGS. 4A and 4B illustrate the number of documents that received a score exceeding the initial threshold value, despite being free of embedded malware, and the number of documents that received a score less than or equal to the initial threshold, despite containing embedded malware, respectively. A determination that a document is likely to contain embedded malware because it receives a score greater than or equal to 7, when in fact it does not contain embedded malware, may be referred to as a false positive determination. A determination that a document is not likely to contain embedded malware because it received a score less than 7, when in fact it does contain embedded malware, may be referred to as a false negative determination. As stated, the general method described herein should minimize the number of false negative and positive determinations. This may be achieved, at least in part, by adjusting the threshold.

Thus, turning attention back to FIG. 2, after generating the initial threshold value in step 210, a decision can be made as to whether the number of false positive determinations and the number of false negative determinations is or is not acceptable, as shown by decision step 215. If the number of false positive determinations and the number of false negative determinations is acceptable, in accordance with the YES path out of decision step 215, the final model threshold value may be set equal to the initial threshold value. However, if the number of false positive determinations and the number of false negative determinations is not acceptable, in accordance with the NO path out of decision step 215, then the initial threshold value may be adjusted, in order to reduce the number of false positive determinations and the number of false negative determinations, as shown by step 220.

Adjusting the initial threshold value may involve parsing and otherwise analyzing yet additional documents. It may, and likely will involve analyzing each of the malicious tags and determining whether the corresponding indication of embedded malware is relatively strong, weak or otherwise. The initial weighting value of 1 may then be adjusted accordingly. For example, it may be adjusted to a lower value if the corresponding malicious tag is determined to provide less of an indication of embedded malware, or adjusted to a higher value if the corresponding malicious tag provides more of an indication of embedded malware. Table III below provides exemplary weighting values other than 1 for an exemplary list of malicious tags pertaining to PDF documents.

However, adjusting the initial threshold may alternatively or additionally involve the establishment of a set of rules which may then be applied with respect to the one or more identified malicious tags in each of the parsed and analyzed documents. By applying these rules, the overall score of each document may be adjusted up or down. When taking into consideration all of the documents that were parsed and otherwise analyzed, the number of false negative determinations and false positive determinations may be reduced. This, in turn, will result in a more precise model threshold value, and more accurate determinations as to whether a subsequently tested electronic document is likely to contain embedded malware.

It will be understood that the rules set forth below are exemplary. In addition, the particular rules that are established are likely to depend on the document format.

One rule, for example, may focus on whether there is a single instance of a particular malicious tag in a given document or whether there are multiple occurrences of the malicious tag. If there are multiple occurrences of the malicious tag, the weighting value, or adjusted weighting value, associated with that malicious tag may be incremented by a predefined amount with each additional occurrence, if multiple occurrences do, in fact, provide an even greater indication of embedded malware. Thus, if there are multiple occurrences of a particular malicious tag, the weighting value associated with that tag may be multiplied by the number of occurrences. Alternatively, the amount the weighting value is incremented may increase with each additional occurrence of the malicious tag or it may decrease with each additional occurrence.

In contrast, there may be other malicious tags where multiple occurrences are not any more indicative of embedded malware than a single occurrence of the malicious tag. In this case, the weighting value associated with that particular tag would not be adjusted, even if multiple occurrences of the tag are identified. Table III below identifies a number of malicious tags whose weighting values are not adjusted, even if there are multiple occurrences.

Another rule may focus on different combinations of malicious tags. Thus, while a certain metadata structure may not by itself be indicative of embedded malware, the combination of that metadata structure with another metadata structure may be indicative of embedded malware. Consequently, the overall score of the electronic document may be incremented if that combination is identified.

Still another rule may focus on the absence of certain metadata structures, where the absence may indicate that a given document is likely to contain embedded malware. As such, the overall score of the document may be incremented by an amount proportional to the relevance of the missing metadata.

Yet another possible rule may focus on the relative occurrence of two or more metadata structures. For example, certain metadata structures are expected to occur in pairs. Thus, if the number of occurrences of one does not match the number of occurrences of the other, this may be an indication of malware, and a reason to increment the overall score attributed to the electronic document.

Again, it will be understood that the rules set forth above are exemplary. Other rules may be established and used to adjust the threshold value. As stated above, this adjustment of the threshold value is advantageous in order to reduce the number of false negative determinations and false positive determinations so that the ultimate determination as to whether a document is or is not likely to contain embedded malware is more accurate and reliable.

Accordingly, turning attention back to FIG. 2, once the threshold has been adjusted, another decision can be made as to whether the now reduced number of false negative and false positive determinations is acceptable, in accordance with decision step 225. If it is decided that the now reduced number of false negative and false positive determinations is not yet acceptable, in accordance with the NO path out of decision step 225, the method may revert back to further adjust the threshold, for example, by parsing and otherwise analyzing additional documents or further adjustment of the weighting values associated with one or more of the malicious tags. However, if it is decided that the now reduced number of false negative and false positive determinations is acceptable, in accordance with the YES path out of decision step 225, the method may move to finalize the model threshold value, as shown by step 230. This threshold value can then be used in the general method illustrated in FIG. 1, as explained in greater detail below.

Again, FIG. 1 illustrates a general method for determining whether an electronic document is likely to contain embedded malware, in accordance with exemplary embodiments of the present invention. To further illustrate this process, the method of FIG. 1 will be described in the context of electronic documents in PDF format.

As shown in FIG. 1, the electronic document would first be parsed or sequenced, and the metadata structures that make up the document would need to be identified, as shown in step 110. As stated above, there are known software tools that are capable of parsing or sequencing and identifying the metadata structures. In the context of PDF documents, one such open source software tool is called PDFid. Another known software tool that is capable of parsing and analyzing PDF documents is called Origami. Information regarding these tools can be found on the Internet.

FIG. 5 is a diagram that illustrates the general structure of a PDF document. As illustrated, and as those skilled in the art will appreciate, a PDF document includes a header, a cross reference table, a trailer and a file body. The header defines, among other things, the version of the PDF specification to which the document format conforms. The file body comprises a sequence of objects that represent the contents of the document. There are many types of objects. Some are listed in FIG. 5. However, for the purpose of this invention, the different types of objects are not material. The cross reference table identifies and permits access to any of the objects in such a way that it is not necessary to read the entire file to locate a particular object. The trailer enables an application reading the file to quickly find the cross reference table and certain special objects.

Figure 6:
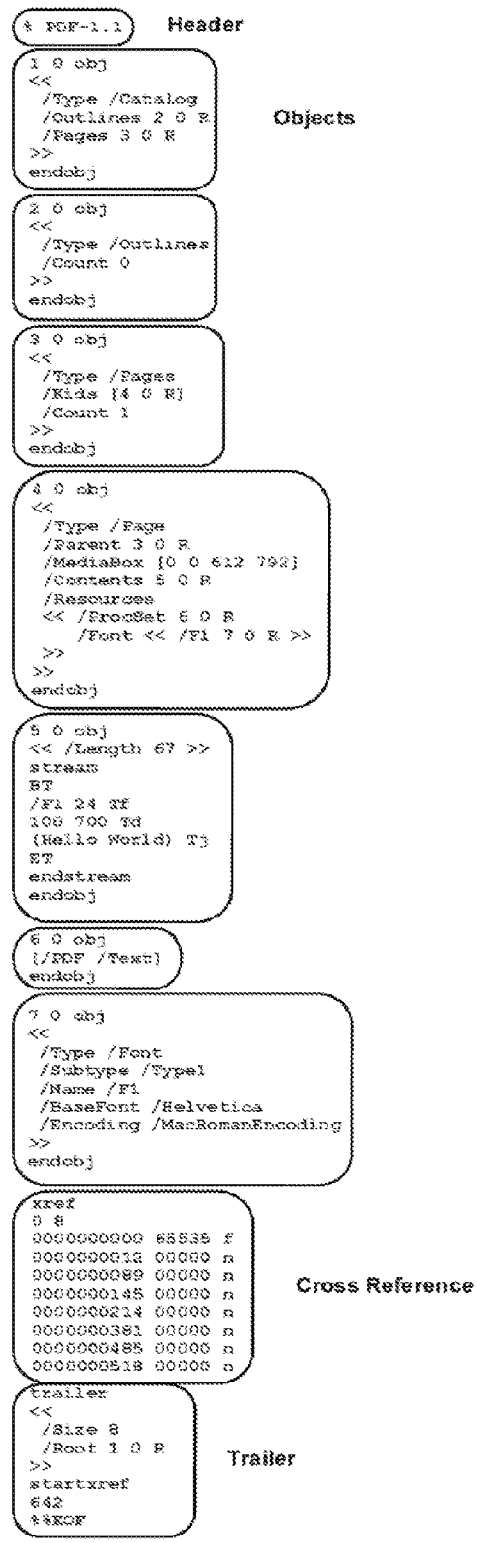
FIG. 6 illustrates the metadata sequence of an exemplary PDF document as it might be viewed using a text editor.

FIG. 6 expands upon the diagram of FIG. 5, by illustrating, in greater detail, a PDF document as it might be viewed using a text editor. This example was taken from the following webpage blog.didierstevens.com/2008/04/09/quickpost-about-the-physical-and-lo. As one can see, the PDF document comprises a header, a file body, a cross reference table (xref) and a trailer. The file body, in turn, comprises a plurality of objects. In this example, there are seven objects. Previously, it was stated that electronic documents are composed of data and metadata, and that the metadata provides information about how to process and present data. The various objects, the header, the cross reference table and trailer all constitute the metadata that make up the PDF document.

If a PDF document is parsed or sequenced, in accordance with step 110 of FIG. 1, the software tool employed for that purpose, such as the PDFid software tool, will parse or sequence the PDF document so that the document can be observed in much the same way as it appears in FIG. 6. It can then list and identify the various metadata structures that make up the PDF document. In the case of PDFid, a listing of the metadata structures that make up the PDF document may be generated as illustrated in Table I below, where the numbers to the right signify the number of times each corresponding metadata structure appears in the PDF document.

TABLE I

PDFiD 0.0.11 normal/snort_manual_2_8_6.pdf
PDF Header: % PDF-1.3

| | |
|---|---|
| obj | 9473 |
| endobj | 9472 |
| stream | 4512 |
| endstream | 4512 |
| xref | 1 |
| trailer | 1 |
| startxref | 1 |
| /Page | 191 |
| /Encrypt | 0 |
| /ObjStm | 0 |
| /JS | 0 |
| /JavaScript | 0 |
| /AA | 0 |
| /OpenAction | 0 |
| /AcroForm | 0 |
| /JBIG2Decode | 0 |
| /RichMedia | 0 |
| /URI | 0 |
| /EmbeddedFile | 0 |
| /EmbeddedFiles | 0 |
| /cmd | 0 |
| /Action | 0 |
| /Launch | 0 |
| /Colors > 2^24 | 0 |

As explained previously, and in accordance with step 205 in FIG. 2, certain metadata structures have been determined to be more or less indicative of embedded malware. Accordingly, it is these metadata structures (i.e., the malicious tags) that are of primary interest, and it may be possible to customize the listing of metadata structures produced during step 110 so that only those metadata structures of interest are listed. Alternatively, as part of an additional step, the list of metadata structures produced during step 110 may be compared with the metadata structures of interest from step 205, and the latter may be extracted from the list of metadata structures produced during step 110. In either case, the end result of step 110 is that each metadata structure of interest, i.e., each malicious tag, that is present in the PDF document is identified, along with the number of corresponding occurrences.

For the purpose of illustration and not limitation, Table II below provides a list of exemplary metadata structures (i.e., malicious tags) that may be relevant in determining whether a PDF document contains embedded malware. It will be understood that each of these metadata structures have legitimate purposes, and are not conclusively indicative of embedded malware. It will also be understood that different types of metadata structures may exist for document formats other than PDF.

TABLE II

| Name | Description |
|---|---|
| OpenAction | Indicates that a destination is to be displayed or an action is to be performed when the document is opened |
| RichMedia | Indicates there is an Adobe Flash or other multimedia file contained in the PDF document |
| Embedded | Indicates another file is contained within the PDF document |
| CMD | Contains RichMedia Command set of keyword (dictionary) containing command names and arguments to be executed upon using the rich-media-execute action. |
| AA | Indicates that an additional action will occur when the document is opened |
| Actions | Indicates an action for the viewer application to perform, such as launching an application, playing a sound, or changing an annotation's appearance. |
| Launch | Indicates that an application will launch or a document may print when the document is opened |
| AcroForm | Indicates the presence of an interactive form |
| URI | Indicates the presence of a hypertext link |
| JS or Javascript | Indicates the presence of Javascript code that can be executed inside the file |
| Page | Indicates the number of pages of the document (number should not be 0) |
| ObjStm | Indicates the number of stream objects contained within the PDF file |
| PDF Header | Indicates the version number of the PDF specification implemented by the PDF file |
| Cross Reference Table | Indicates location of each indirect object within the body of the document |
| Object Stream | Indicates the presence of an object stream, which contains a sequence of PDF objects. The purpose of object streams is to allow a greater number of PDF objects to be compressed, thereby substantially reducing the size of PDF files. |
| Stream/EndStream | Indicates the beginning and end of a stream (numbers should match) |
| Obj/EndObj | Indicates the beginning and end of an object (numbers should match) |
| JBIG2Decode | Indicates that JBIG2Decode compression is being used |

Previously, and as part of the process of adjusting the initial threshold value in step 220 of FIG. 2, a number of rules were applied with respect to the identified metadata structures (i.e., malicious tags). The same or similar process will be conducted in accordance with step 115 in FIG. 1. In general, the rules may involve attributing a pre-established weighting value to each of the malicious tags identified in the PDF document. As stated, the weighting values may be adjusted depending on the number of times a given tag occurs in the PDF document. Table III below presents exemplary weighting values for the list of exemplary tags in Table II above, along with a brief explanation as to why these tags may be indicative of embedded malware.

TABLE III

| Name | Weighting Value | Explanation |
|---|---|---|
| OpenAction | $openaction = 0.35 | The value contained in the metadata structure represents a destination or an action. If there is no such structure, the document should open at the top of the first page as a default. The weighting value is multiplied per time of occurrences. |
| RichMedia | $richmedia = 1.0 | Because of the popularity of Flash Player and because PDF documents can contain richmedia/Flash files, attackers have been using PDF documents as a delivery mechanism for Flash exploits. |
| Embedded | $embedded = 1.5 | The presence of an embedded file stream means the contents of an external file may be embedded in the PDF document. This may be indicative of embedded malware. |
| CMD | $cmd = 1.5 | This tag is not typically associated with PDF documents, and its legitimate usage is rare. It can be used to perform commands and can suggest the presence of embedded malware. |
| AA | $aa = 0.55 | These metadata structures may be associated with annotations, page objects and interactive forms, and they may trigger the execution of a given action. The weighting value is multiplied per time of occurrences. |
| Action | $action = 0.35 | The launching of any application or routine from within the PDF document may be indicative of embedded malware. |
| Launch | $launch = 1.5 | The optional Win, Mac, and Unix entries allow the action dictionary to include platform-specific parameters for launching the designated application. |
| AcroForm | $acroform = 1.5 | An AcroForm or interactive form is a collection of fields for gathering information interactively from the user. Arbitrary fields can be imported to or exported from the PDF document. Thus, the presence of this tag may be indicative of embedded malware. |
| URI | $ufi = 0.2 | An external resource on the Internet identified by a URI may be indicative of embedded malware. |
| JS or Javascript | $js = 0.675 $javascript = 0.675 | JavaScript actions cause a script to be compiled and executed by the JavaScript interpreter. Depending on the nature of the script, various interactive form fields in the document may update their values or change their visual appearances. |
| Page | $page(0) = 1.9 $page(1) = 0.55 | An indication that the PDF document has but a single page was found to be common in PDF documents known to contain embedded malware. An indication that the PDF document has zero pages was less common, but highly suspect, thus more indicative of embedded malware. As such, $page(0) was attributed slightly higher weighting value than $page(1). |
| ObjStm | $objstm = 0.75 | Object streams allow for a greater number of objects to be compressed into the PDF document. The embedding of a large amount of data into the PDF document may be indicative of embedded malware. |
| PDF Header | if: % PDF-1.0 % PDF-1.1 % PDF-1.2 % PDF-1.3 % PDF-1.4 % PDF-1.5 % PDF-1.6 % PDF-1.7 then: $header = 1.0 | Indicates the version number of the PDF specification to which the document conforms. Some malicious PDF specify wrong versions that don't exist. |
| Cross Reference Table | $xref = 0.3 | The cross reference table has a fixed format including a single line entry for each indirect object in the body of the document. A variation in the fixed format may be indicative of embedded malware. |
| Stream/ EndStream | $stream = 0.65 | Every stream must start with a 'stream' indication and end with an 'endstream' indication. Thus, the number of 'stream' and 'endstream' indications should match. If the values do not match, it may be indicative of embedded malware. |
| Obj/EndObj | $obj = 0.7 | Every object in the file body should start with a 'obj' indication and end with an 'endobj' indication. Therefore, the number of 'obj' indications and the number of 'endobj' indications should match. If they do not match, it may be indicative of malware. |
| JBIG2Decode | $jbig2decode = 1.5 | The JBIG2Decode filter decodes monochrome image data that has been encoded using JBIG2 encoding. There are known flaws associated with this filter and these flaws have made the filter a popular vehicle for attack. Thus, JBIG2Decode may be indicative of embedded malware. |

In addition, the rules may cover the situation where an expected metadata structure is absent. An example of this might be the situation where the cross reference table or the trailer is missing from the PDF document. In example of Table III above, if the cross reference table is missing, a weighting value of 0.3 may be added to the overall score of the PDF document.

In addition to applying weighting values to each of any malicious tags that are identified in the PDF document, the rules may also involve attributing a pre-established weighting value to certain known combinations of tags. It should be noted that the weighting value may be a positive or a negative value depending on whether the combination is indicative of embedded malware or indicative of the absence of embedded malware. In one example, the identified combination of (AA or Acroform or OpenAction or Action) in combination with (RichMedia or JavaScript or JS or Embedded or CMD) may be indicative of embedded malware. Thus, when the score for the PDF document is compiled, the overall score may be incremented by an additional amount, for example, by an additional score of 0.4. On the other hand, the absence of this combination may be indicative of a lack of embedded malware. As such, the overall score of the PDF document may be decremented, for example, by a value of −0.5.

Still further, the rules may involve attributing a pre-established weighting value to relative occurrences of two tags, where the weighting value may be a positive value or a negative value depending on whether the relative values associated with the tags do or do not match. In Table III above, there are two examples of attributing a pre-established weighting value to the relative occurrences of two tags. The first example involves the Stream and EndStream tags. As explained, these tags indicate the beginning and end of each object stream. If there are three object streams in the PDF document, there should be three occurrences of the Stream tag and three occurrences of the EndStream tag. However, if the number of occurrences of the Stream tag and EndStream tag do not match, it may be indicative of embedded malware, as stated. Thus, in the present example, the pre-established weighting value of 0.65 is attributed thereto. The second example involves the Obj and EndObj tags. As explained, these tags indicate the beginning and end of each object. If there are ten objects in the PDF document, there should be ten occurrences of the Obj tag and ten occurrences of the EndObj tag. However, if the number of occurrences of the Obj tag and EndObj tag do not match, it may be indicative of embedded malware. Thus, in the present example, the pre-established weighting value of 0.7 is attributed thereto. Although it is not presented in this example, one skilled in the art will appreciate that the rules may apply a negative pre-established weighting value when the number of occurrences of these tags do match.

After the rules have been applied, in accordance with step 115 of FIG. 1, an overall score is determined for the PDF document, as shown in step 120. The overall score may be determined, for example, by compiling all of the weighting values that were established by applying the rules in step 115. As one skilled in the art will readily understand from the foregoing description, the greater the overall score of the PDF document, the more likely it is that the PDF document contains embedded malware. The lower the overall score, the less likely it is that the PDF document contains embedded malware.

After determining the overall score for the PDF document, the overall score may be compared to the model threshold value, as shown in step 125. The model threshold value is, of course, the threshold value that was based on the statistical model established using the method illustrated in FIG. 2. Then a determination is made as to whether the overall score is less than the model threshold value or greater than or equal to the model threshold value, according to decision step 130. As illustrated, if the overall score of the PDF document is equal to or greater than the model threshold value, it is determined that the PDF document is likely to contain embedded malware, as shown by the YES path out of decision step 130. If the overall score of the PDF document is less than the model threshold value, it is determined that the PDF document is not likely to contain embedded malware, as shown by the NO path out of decision step 130.

It will be understood that the methods described herein above may be implemented in software and executed by a processor, where the software and processor may reside on a local platform, a local network server, a remote server connected via the Internet and/or other network connections, or a combination thereof. In one exemplary embodiment, the software would be incorporated into a computer or computer network security system, such as a computer network email security system. Moreover, it will be understood that the various steps and processes described above may be implemented through the reception, processing, parsing, sequencing, modification and/or adjustment and comparison of electronic signals, and the storage of data represented by those signals, in and by the host computer system.

The present invention has been described above in terms of exemplary embodiments. One of ordinary skill in the art should not interpret the embodiments as limiting in any way, as they are exemplary. Clearly, other embodiments are well within the scope of the present invention. The scope the present invention will instead be determined by the appended claims.

I claim:

1. A method of determining a likelihood that an electronic document contains embedded malware, the method comprising:

processing one or more signals that represent a contents of the electronic document to identify one or more pre-defined metadata structures that, at least in part, make up the electronic document;

applying a set of pre-established rules to the one or more pre-defined metadata structures such that a numerical score is attributed to the electronic document;

comparing the numerical score attributed to the electronic document with a pre-established model threshold value; and determining whether the electronic document is likely to contain embedded malware based on a result of the comparing.

2. The method of claim 1, wherein processing the one or more signals that represent the contents of the electronic document so as to identify the one or more pre-defined metadata structures includes:

parsing the one or more signals that represent the contents of the electronic document so as to identify the metadata structures that make up the electronic document; and identifying the one or more pre-defined metadata structures from amongst the metadata structures that make up the electronic document.

3. The method of claim 1, further including:

determining the number of occurrences of a given one of the identified, pre-defined metadata structures; and incrementing a weighting value attributed to the given one of the identified, pre-defined metadata structures by an amount based on the number of occurrences.

4. The method of claim 3, wherein incrementing the weighting value by an amount based on the number of occurrences includes:

multiplying the weighting value attributed to the given one of the identified, pre-defined metadata structures by the number of occurrences.

5. The method of claim 3, wherein incrementing the weighting value by an amount based on the number of occurrences includes: incrementing the weighting value attributed to the given one of the identified, pre-defined metadata structures by an amount that varies with each additional occurrence.

6. The method of claim 5, wherein the amount increases in value with each additional occurrence.

7. The method of claim 5, wherein the amount decreases in value with each additional occurrence.

8. The method of claim 1, wherein the pre-established model threshold value is a function of a prior parsing and analysis of a plurality of pre-existing electronic documents having the same format as the electronic document.

9. The method of claim 1, wherein determining whether the electronic document is likely to contain embedded malware based on a result of the comparison includes:

determining whether the numerical score attributed to the electronic document is less than the pre-established model threshold value or greater than or equal to the pre-established model threshold value.

10. The method of claim 9, wherein determining whether the electronic document is likely to contain embedded malware based on a result of the comparison further includes:
determining that the electronic document is likely to contain embedded malware if it is determined that the numerical score attributed to the electronic document is greater than or equal to the pre-established model threshold value.

11. The method of claim 9, wherein determining whether the electronic document is likely to contain embedded malware based on a result of the comparison further includes:
determining that the electronic document is not likely to contain embedded malware if it is determined that the numerical score attributed to the electronic document is less than the pre-established model threshold value.

12. A method of determining a likelihood that an electronic document contains embedded malware, the method comprising:
processing one or more signals that represent a contents of the electronic document so as to identify one or more pre-defined metadata structures that, at least in part, make up the electronic document;
attributing a weighting value to each of the identified, one or more pre-defined metadata structures; wherein the weighting value attributed to each identified, pre-defined metadata structure reflects a degree to which the corresponding, pre-defined metadata structure relates to the likelihood the document contains embedded malware;
generating a numerical score for the electronic document by combining the weighting values that were attributed to each of the identified, one or more pre-defined metadata structures;
comparing the numerical score attributed to the electronic document to a pre-established model threshold value; and
determining whether the electronic document is likely to contain embedded malware based on a result of the comparison.

13. The method of claim 12, wherein processing the one or more signals that represent the contents of the electronic document so as to identify the one or more pre-defined metadata structures includes:
parsing the one or more signals that represent the contents of the electronic document so as to identify the metadata structures that make up the electronic document; and
identifying the one or more pre-defined metadata structures from amongst the metadata structures that make up the electronic document.

14. The method of claim 12, further including:
determining the number of occurrences of a given one of the identified, one or more pre-defined metadata structures; and
incrementing a weighting value attributed to the given one of the identified, pre-defined metadata structures by an amount based on the number of occurrences.

15. The method of claim 14, wherein incrementing the weighting value by an amount based on the number of occurrences includes:
multiplying the weighting value attributed to the given one of the identified, pre-defined metadata structures by the number of occurrences.

16. The method of claim 14, wherein incrementing the weighting value by an amount based on the number of occurrences includes:
incrementing the weighting value attributed to the given one of the identified, pre-defined metadata structures by an amount that varies with each additional occurrence.

17. The method of claim 16, wherein the amount increases in value with each additional occurrence.

18. The method of claim 16, wherein the amount decreases in value with each additional occurrence.

19. The method of claim 12, wherein the pre-established model threshold value is a function of a prior parsing and analysis of a plurality of pre-existing electronic documents having the same format as the electronic document.

20. The method of claim 12, wherein determining whether the electronic document is likely to contain embedded malware based on a result of the comparison includes:
determining whether the numerical score attributed to the electronic document is less than the pre-established model threshold value or greater than or equal to the pre-established model threshold value.

21. The method of claim 20, wherein determining whether the electronic document is likely to contain embedded malware based on a result of the comparison further includes:
determining that the electronic document is likely to contain embedded malware if it is determined that the numerical score attributed to the electronic document is greater than or equal to the pre-established model threshold value.

22. The method of claim 20, wherein determining whether the electronic document is likely to contain embedded malware based on a result of the comparison further includes:
determining that the electronic document is not likely to contain embedded malware if it is determined that the numerical score attributed to the electronic document is less than the pre-established model threshold value.

23. A storage disk or storage device comprising instructions that, when executed, cause a machine to determine a likelihood that an electronic document contains embedded malware by:
processing one or more signals that represent a contents of the electronic document to identify one or more pre-defined metadata structures that, at least in part, make up the electronic document;
applying a set of pre-established rules to the one or more pre-defined metadata structures such that a numerical score is attributed to the electronic document;
comparing the numerical score attributed to the electronic document with a pre-established model threshold value; and
determining whether the electronic document is likely to contain embedded malware based on a result of the comparing.

* * * * *